US011047588B2

United States Patent
Zhao et al.

(10) Patent No.: US 11,047,588 B2
(45) Date of Patent: Jun. 29, 2021

(54) BIOSOME COUNTING AND DEVICE CONTROLLING FOR A PREDETERMINED SPACE REGION

(71) Applicant: Carrier Corporation, Palm Beach Gardens, FL (US)

(72) Inventors: Jianwei Zhao, Shanghai (CN); Liang Cai, Shanghai (CN); Qiang Li, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 174 days.

(21) Appl. No.: 16/176,641

(22) Filed: Oct. 31, 2018

(65) Prior Publication Data
US 2019/0128552 A1 May 2, 2019

(30) Foreign Application Priority Data
Nov. 1, 2017 (CN) .......................... 201711055129.2

(51) Int. Cl.
*F24F 11/63* (2018.01)
*H04W 4/021* (2018.01)
(Continued)

(52) U.S. Cl.
CPC .............. *F24F 11/63* (2018.01); *F24F 11/50* (2018.01); *F24F 11/72* (2018.01); *G05B 15/02* (2013.01);
(Continued)

(58) Field of Classification Search
CPC .. F24F 11/63; F24F 11/50; F24F 11/72; F24F 2120/10; F24F 2120/20; F24F 2120/12;
(Continued)

(56) References Cited

U.S. PATENT DOCUMENTS 9,398,422 B2  7/2016  Zampini, II
9,516,474 B2  12/2016  Finnerty et al.
(Continued)

FOREIGN PATENT DOCUMENTS

WO   2016106287 A1   6/2016
WO   2017078941 A1   5/2017

OTHER PUBLICATIONS

Coelho, Jorge Miguel, "Fine Tuning HVAC Operation Through RFID and User Feedback", Thesis to Obtain the Master of Science Degree in Information Systems and Computer Engineering, TECNICO LISBOA, Oct. 2015, 94 pages.
(Continued)

*Primary Examiner* — Mohammad Ali
*Assistant Examiner* — Sheela Rao
(74) *Attorney, Agent, or Firm* — Cantor Colburn LLP

(57) ABSTRACT

A living organism statistical system in a predetermined spatial region according to the present invention includes Bluetooth modules that can be carried by living organisms and configured to broadcast a Bluetooth signal to the predetermined spatial region, and a living organism statistical device mounted in the predetermined spatial region and configured to receive Bluetooth signals from one or more of the Bluetooth modules and obtain quantity information of living organisms in the predetermined spatial region based on the received Bluetooth signals. The present invention can implement automatic determination of quantity information of living organisms in a predetermined spatial region, and therefore, the present invention can dynamically control one or more air terminal devices of an HVAC system in a self-adaptive manner according to changes in the quantity information.

22 Claims, 5 Drawing Sheets

(51) Int. Cl.
 *H04W 4/029* (2018.01)
 *H04W 4/80* (2018.01)
 *F24F 11/72* (2018.01)
 *G05B 15/02* (2006.01)
 *H04W 4/33* (2018.01)
 *F24F 11/50* (2018.01)
 *F24F 120/12* (2018.01)
 *F24F 120/10* (2018.01)
 *F24F 120/20* (2018.01)

(52) U.S. Cl.
 CPC ........... *H04W 4/021* (2013.01); *H04W 4/029* (2018.02); *H04W 4/33* (2018.02); *H04W 4/80* (2018.02); *F24F 2120/10* (2018.01); *F24F 2120/12* (2018.01); *F24F 2120/20* (2018.01)

(58) Field of Classification Search
 CPC ....... H04W 4/021; H04W 4/029; H04W 4/80; H04W 4/33; G05B 15/02
 See application file for complete search history.

(56) References Cited

U.S. PATENT DOCUMENTS

| | | | |
|---|---|---|---|
| 9,618,222 | B1 | 4/2017 | Hussain et al. |
| 2013/0297078 | A1 | 11/2013 | Kolavennu |
| 2014/0220883 | A1 | 8/2014 | Emigh et al. |
| 2014/0316582 | A1 | 10/2014 | Berg-Sonne et al. |
| 2015/0338117 | A1 | 11/2015 | Henneberger et al. |
| 2015/0364017 | A1 | 12/2015 | Hall et al. |
| 2016/0040902 | A1 | 2/2016 | Shah |
| 2016/0054023 | A1 | 2/2016 | Baker et al. |
| 2016/0223215 | A1 | 8/2016 | Buda et al. |
| 2016/0308570 | A1* | 10/2016 | Yamanaka ........... H04B 1/3883 |
| 2017/0038787 | A1 | 2/2017 | Baker et al. |
| 2017/0074539 | A1 | 3/2017 | Bentz et al. |
| 2017/0074541 | A1 | 3/2017 | Bentz et al. |
| 2017/0124842 | A1* | 5/2017 | Sinha ..................... A61B 5/681 |

OTHER PUBLICATIONS

Gupta, Santosh K., et al., "Singular Perturbation Method for Smart Building Temperature Control Using Occupant Feedback", Asian Journal of Control, vol. 20, No. 1, Jan. 2018, pp. 386-402.

Mansure, Vitor et al., "A Learning Approach for Energy Efficiency Optimization by Occupancy Detection", YDreams Robotics, Lisbon, Portugal, 2015, pp. 9-15.

European Search Report for application 18203744.0, dated Mar. 22, 2019, 8 pages.

* cited by examiner

BIOSOME COUNTING AND DEVICE CONTROLLING FOR A PREDETERMINED SPACE REGION

FOREIGN PRIORITY

This application claims priority to Chinese Patent Application No. 201711055129.2, filed Nov. 1, 2017, and all the benefits accruing therefrom under 35 U.S.C. § 119, the contents of which in its entirety are herein incorporated by reference.

TECHNICAL FIELD

The present invention relates to the technical field of intelligent control over devices in buildings, and to a living organism statistical device that can automatically obtain quantity information of living organisms in a predetermined spatial region and a living organism statistical system including the same, and a system that controls one or more devices in a predetermined spatial region by using quantity information of living organisms in the predetermined spatial region and a control method thereof.

BACKGROUND ART

A spatial region (such as a meeting room and an office) is generally provided with a variety of devices. A common device is a device configured to change an environment condition of the spatial region to meet environmental condition improvement requirements of persons in the predetermined spatial region, e.g., an air terminal device of a Heating Ventilation Air Conditioning (HVAC) system, specifically such as a Fan Coil Unit (FCU).

At present, an air terminal device such as an FCU in a spatial region is generally manually controlled by a person actively. For example, a plurality of FCUs in the spatial region are adjusted and controlled manually by using one or more thermostats. The operation is very inconvenient. Moreover, it is impossible to intelligently adjust and control the environmental condition in a self-adaptive manner according to dynamic changes in the quantity of persons in the spatial region.

SUMMARY OF THE INVENTION

According to a first aspect of the present invention, a living organism statistical device is provided, which can be mounted in a predetermined spatial region, wherein the living organism statistical device is configured to receive Bluetooth signals of Bluetooth modules carried by living organisms and obtain quantity information of living organisms in the predetermined spatial region based on the received Bluetooth signals.

According to a second aspect of the present invention, a living organism statistical system for a predetermined spatial region is provided, including: a Bluetooth module that can be carried by a living organism and configured to broadcast a Bluetooth signal; and the living organism statistical device mentioned above.

According to a third aspect of the present invention, a system for controlling a device in at least one predetermined spatial region is provided, the device in the predetermined spatial region includes one or more air terminal devices of a Heating Ventilation Air Conditioning (HVAC) system mounted in the predetermined spatial region, and the system includes: the living organism statistical system mentioned above; and an HVAC control management unit of the HVAC system, wherein the living organism statistical system is in communication connection with the HVAC control management unit, and the HVAC control management unit is configured to automatically control the one or more air terminal devices at least based on the quantity information obtained by the living organism statistical system.

According to a fourth aspect of the present invention, a method for controlling a device in at least one predetermined spatial region is provided, the device in the predetermined spatial region including one or more air terminal devices of a Heating Ventilation Air Conditioning (HVAC) system mounted in the predetermined spatial region, and the method including the following steps: receiving Bluetooth signals of Bluetooth modules carried by living organisms in the predetermined spatial region; obtaining quantity information of the living organisms in the predetermined spatial region based on the received Bluetooth signals; and automatically controlling one or more of the air terminal devices at least based on the quantity information, wherein the HVAC control management unit is connected to one or more of the air terminal devices.

The foregoing features and operations of the present invention will become more apparent according to the following descriptions and accompanying drawings.

BRIEF DESCRIPTION OF THE DRAWINGS

The above and other objectives and advantages of the present invention will be more complete and clearer through the following detailed description with reference to the accompanying drawings, where identical or similar elements are represented by using identical reference numerals.

FIG. 3 is a schematic structural diagram of a Bluetooth module of a living organism statistical system according to an embodiment of the present invention, wherein FIG. 3(a) is a front side of the Bluetooth module, and FIG. 3(b) is a back side of the Bluetooth module.

DETAILED DESCRIPTION

The present invention will be described more thoroughly with reference to the accompanying drawings, and exemplary embodiments of the present invention are shown in the accompanying drawings. However, the present invention can be implemented in many different forms, and it should not be construed that the present invention is limited to the embodiments described here. In contrast, these embodiments are provided such that the disclosure becomes thorough and complete, and concepts of the present invention are totally conveyed to those skilled in the art.

Some block diagrams (such as block diagrams other than an air terminal device, a sensing component, and a sensor) are functional entities, and are not necessarily corresponding to physically or logically independent entities. It will be understood that these functional entities (e.g., a part of block diagrams in the air terminal device and the sensing component) are implemented by software, or these function entities are implemented in one or more hardware modules or integrated circuits, or these functional entities are implemented in different processing apparatuses and/or microcontroller apparatuses.

A control system, a living organism statistical system, a living organism statistical device, and a specific control method according to embodiments of the present invention are illustrated specifically in the following with reference to FIG. 1 to FIG. 6.

Figure 1:
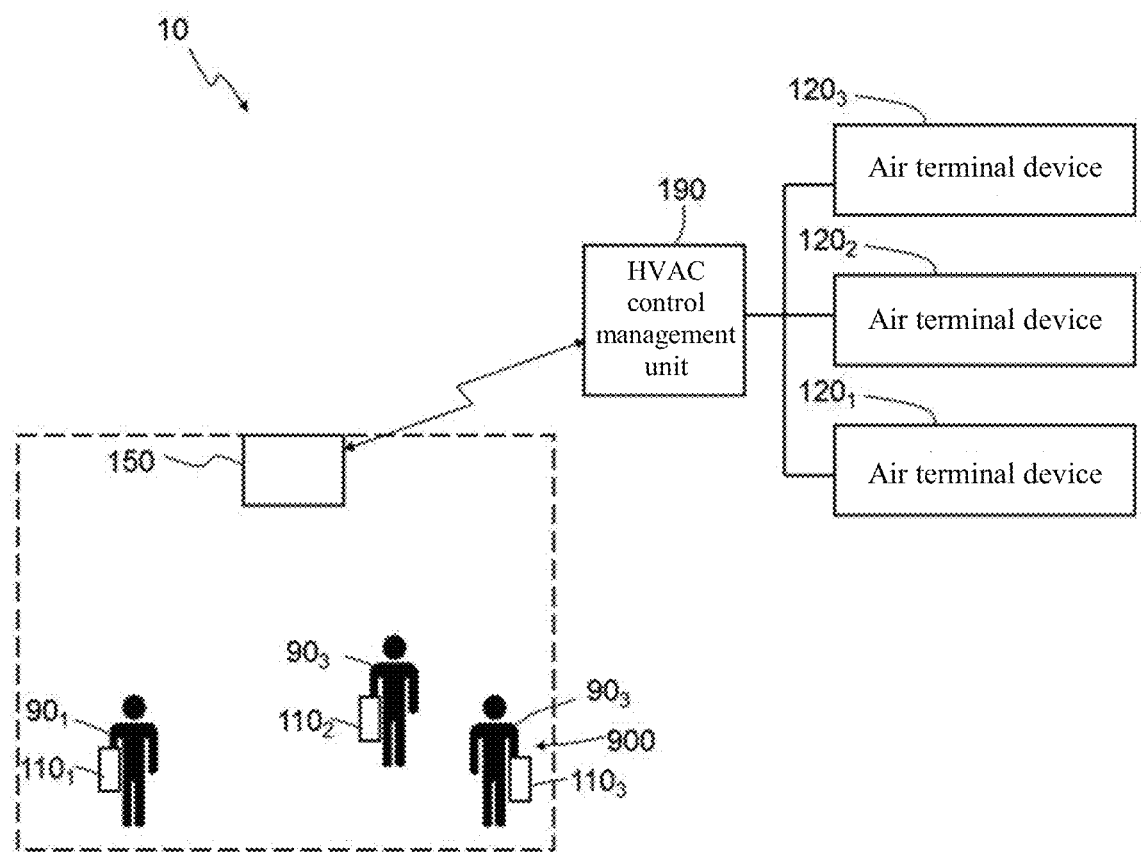
FIG. 1 is a schematic structural diagram of modules of a control system according to an embodiment of the present invention, wherein the control system is configured to control a device in a predetermined spatial region.

As shown in FIG. 1, a control system 10 is a system configured to control a device (e.g., one or more air terminal devices 120) in a predetermined spatial region 900, and mainly includes a living organism statistical system according to an embodiment of the present invention. The living organism statistical system can obtain quantity information of persons in real time or in different periods in the predetermined spatial region 900, and even can further calculate to obtain density information and even density distribution information of the persons and send the obtained information to an HVAC control management unit 190 of the control system 10. The HVAC control management unit 190 controls one or more air terminal devices 120 (e.g., three air terminal devices 1201, 1202, and 1203) based on the quantity information (even including the density information and/or density distribution information), thus implementing automatic control over a plurality of air terminal devices 120 in the predetermined spatial region 900 dynamically and intelligently. Therefore, persons 90 in the predetermined spatial region 900 can obtain better or more suitable environmental conditions (such as more suitable temperature, blast volume, and humidity).

Corresponding to the application of the living organism statistical system in the HVAC system, the air terminal device 120 can specifically be an FCU, or another type of indoor air terminal device (e.g., an air conditioning unit or an air handling unit, a combined air-conditioning unit, a fresh air handling unit, and an air-conditioning cabinet). It will be understood that they all can be controlled by the HVAC control management unit 190 of the HVAC system.

Figure 2:
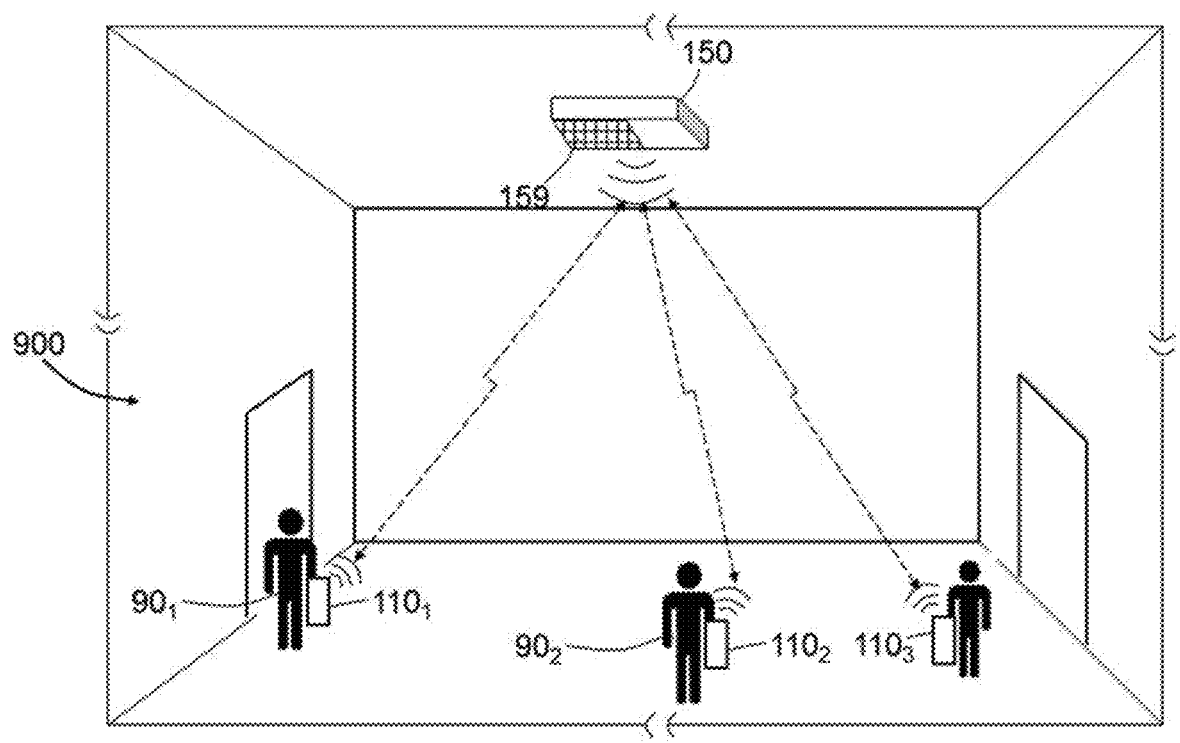
FIG. 2 is a schematic diagram of a living organism statistical system mounted in a predetermined spatial region according to an embodiment of the present invention.

As shown in FIG. 1 and FIG. 2, the living organism statistical system mainly includes a living organism statistical device 150 and a Bluetooth module 110 carried by a person 90. The Bluetooth module 110 is configured to broadcast a corresponding Bluetooth signal, specifically, broadcast a Bluetooth signal continuously or broadcast a Bluetooth signal discontinuously. A propagation distance (e.g., an ideal propagation distance without any obstruction) of the Bluetooth signal broadcasted by the Bluetooth module 110 is predetermined. For example, the signal intensity of the broadcasted Bluetooth signal is predetermined based on a Bluetooth communication protocol.

The Bluetooth module 110 is carried by the person 90, and therefore, when the person 90 is located or enters the predetermined spatial region 900, the Bluetooth module 110 can broadcast a Bluetooth signal to the predetermined spatial region 900. The living organism statistical device 150 can actively receive Bluetooth signals broadcasted to the predetermined spatial region 900. For example, the living organism statistical device 150 senses each Bluetooth module 110 by active scanning, so as to establish a Bluetooth connection with each Bluetooth module 110 and receive a Bluetooth signal broadcasted by each Bluetooth module 110, thus being able to sense all Bluetooth modules 110 in the predetermined spatial region 900.

One living organism statistical device 150 in the predetermined spatial region 900 is exemplified in FIG. 1 and FIG. 2. It should be understood that the quantity of the living organism statistical devices 150 mounted in the predetermined spatial region 900 as shown in FIG. 1 and FIG. 2 and a mounting distribution manner thereof can be determined according to the size of the predetermined spatial region 900, a distance at which the living organism statistical device 150 can sense whether a Bluetooth module 110 exists, and the like. For example, if a range in which the living organism statistical device 150 can sense a Bluetooth module 110 is $\pi r2=3.14\times10$ m$\times10$ m, the size of the predetermined spatial region 900 is 40 m$\times40$ m, and therefore, 4 living organism statistical devices 150 need to be mounted uniformly in the predetermined spatial region. Each living organism statistical device 150 correspondingly senses a sub-spatial region.

Still as shown in FIG. 2, the living organism statistical device 150 can be mounted at a top position (e.g., a substantially central position of a top plate of the predetermined spatial region 900) of the predetermined spatial region 900, so as to easily receive the Bluetooth signals broadcasted by a plurality of Bluetooth modules 110 located in a bottom space (because the persons 90 move in a ground space of the predetermined spatial region 900 in most cases) without blocking. However, it should be understood that the mounting position or mounting form of the living organism statistical device 150 in the predetermined spatial region 900 is not limited. For example, the living organism statistical device 150 can be mounted together with a thermostat of the HVAC system, thus being conducive to reducing wiring between the living organism statistical device 150 and the HVAC system (especially when they are in communication connection in a wired manner). For another example, a plurality of living organism statistical devices 150 can be respectively mounted in substantially central positions of a plurality of sidewalls of the predetermined spatial region 900. For another example, the living organism statistical device 150 can be mounted fixedly or mounted detachably.

In an embodiment, the living organism statistical device 150 can specifically be implemented by a Bluetooth Low Energy (BLE) communication module. Corresponding, the Bluetooth module 110 is also a BLE module. For example, Bluetooth interaction can be performed between the living organism statistical device 150 and the Bluetooth module 110 based on the BLE4.0 protocol. As such, the living organism statistical device 150 and the Bluetooth module 110 have low energy consumption. For example, they can work for a long time when being powered by batteries.

Figure 3:
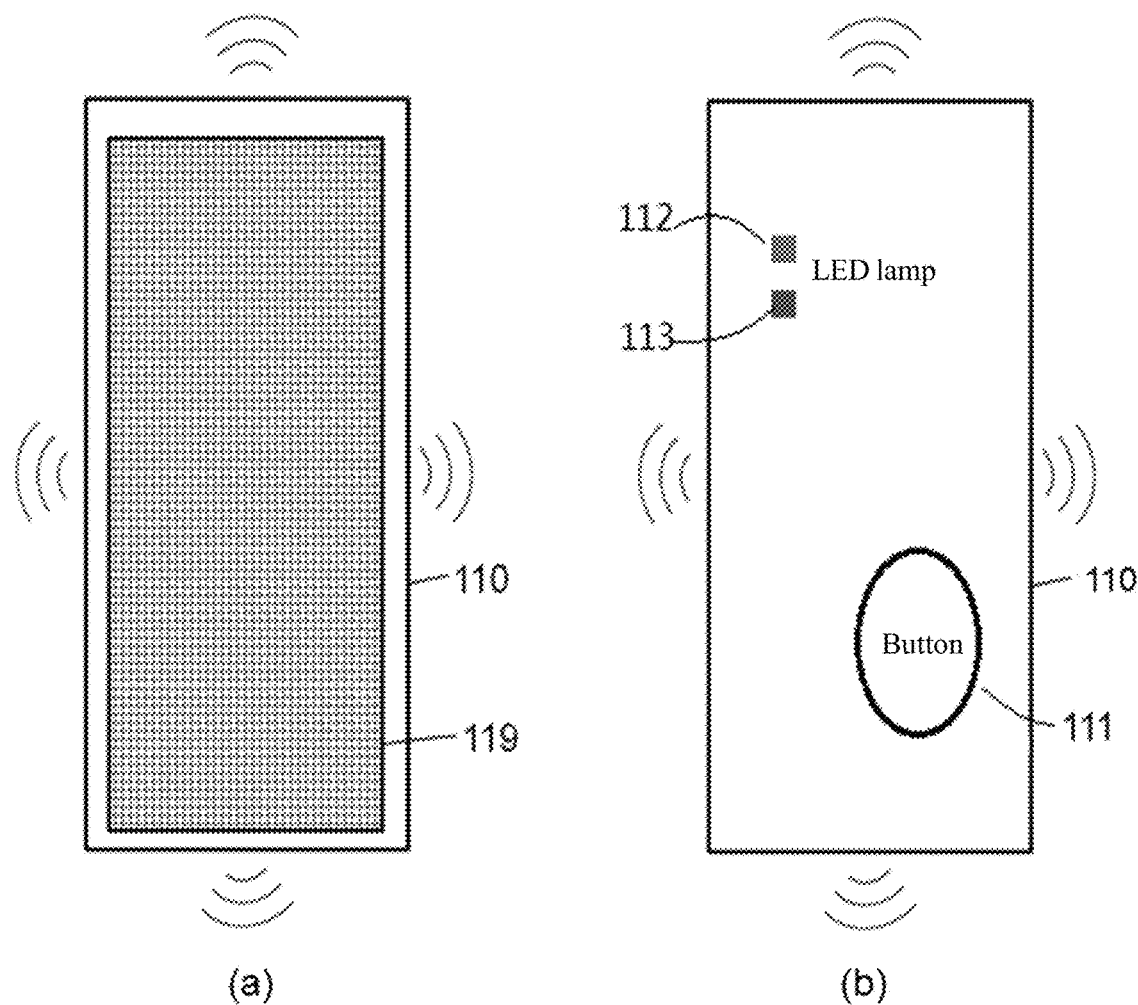

In an embodiment, as shown in FIG. 2 and FIG. 3, the living organism statistical device 150 is provided with a solar panel 159, and/or the Bluetooth module 110 is provided with a solar panel 119. The solar panel 159 and the solar panel 119 can, for example, receive rays of indoor light (which may be emitted by a lighting lamp) to generate electricity and store electric energy in a corresponding energy storage component. Therefore, a battery of the Bluetooth module 110 can be used for a long time without being replaced or no battery component is disposed. It is also possible to omit corresponding wiring for the living organism statistical device 150, being more convenient in mounting.

As shown in FIG. 3, the Bluetooth module 110 in the living organism statistical system is constructed into a card shape in an embodiment, for example, it can be integrated in an employee ID card and carried by each person 90. The Bluetooth module 110 can send corresponding Universally Unique Identifier (UUID) information through the broadcasted Bluetooth signal. When receiving the UUID information sent by the Bluetooth module 110, the living organism statistical device 150 can also automatically count persons 90 entering one or more predetermined spatial regions, so as to implement an attendance function and the like conveniently. In another alternative embodiment, the Bluetooth module 110 can be implemented by another component that is convenient to carry and has a Bluetooth broadcast function, for example, implemented by a smart phone, a wearable smart device (e.g., a bracelet), a Personal Digital Assistant (PAD), and the like. The Bluetooth module 110 can broadcast more information through the Bluetooth signal as required, such as environment information of the predetermined spatial region collected by the wearable smart device.

As shown in FIG. 3, the card-shaped Bluetooth module 110 can broadcast the Bluetooth signal all around, and the intensity of the broadcasted Bluetooth signal can be preset. According to the attenuation property of the Bluetooth signal, the farther distance at which the Bluetooth signal is propagated results in the weaker intensity of the Bluetooth signal. Therefore, a signal intensity determining module 153 of the living organism statistical device 150 can substantially determine a distance from the Bluetooth module 110 to the living organism statistical device 150 based on the signal intensity of the received Bluetooth signal, so as to substantially determine whether the Bluetooth module 110 is located in the predetermined spatial region 900.

Figure 5:
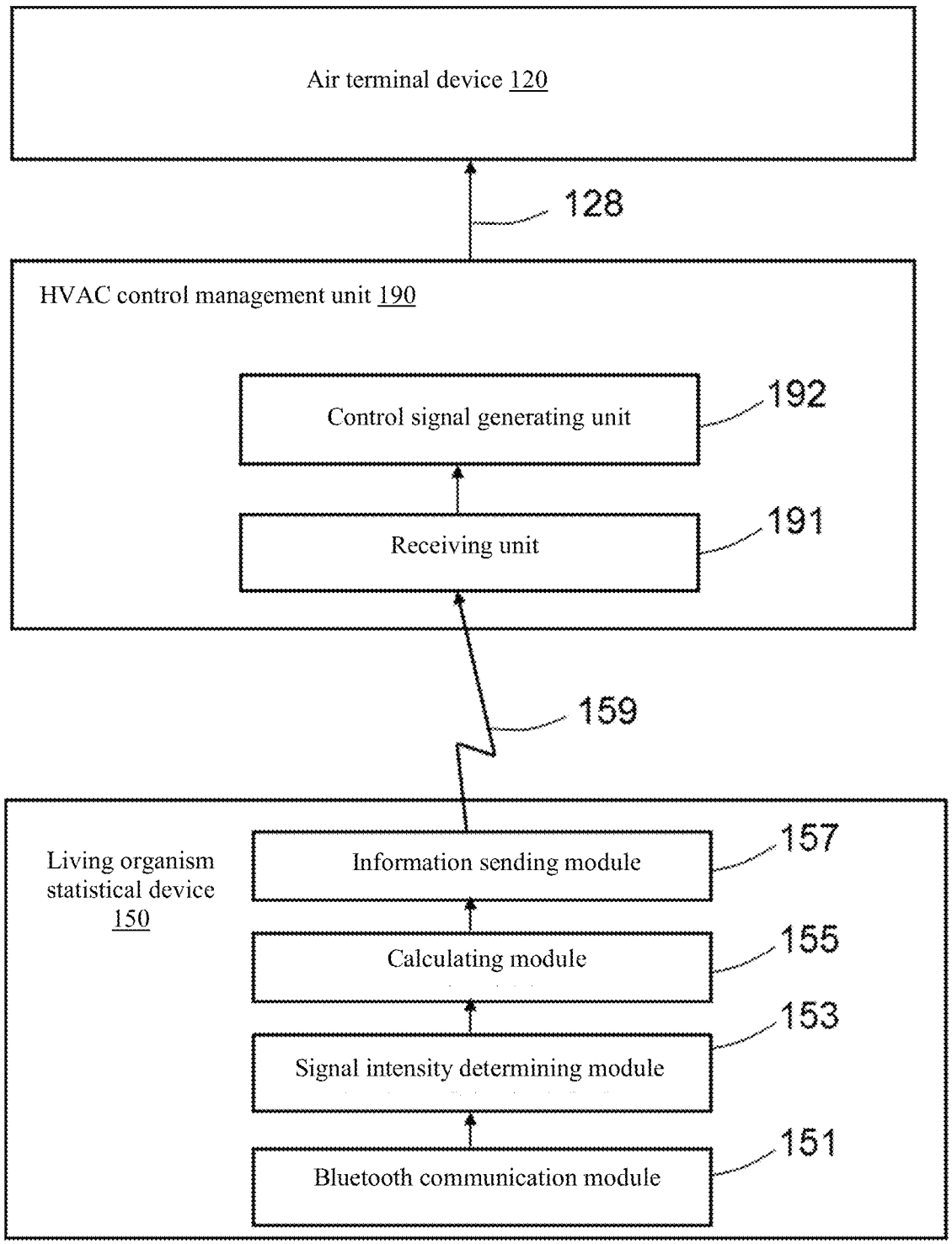
FIG. 5 is a schematic structural diagram of modules of a living organism statistical device and an HVAC control management unit used in the control system in the embodiment of FIG. 1.

In an embodiment, as shown in FIG. 5, a living organism statistical device 150 according to an embodiment of the present invention includes a Bluetooth communication module 151. The Bluetooth communication module 151 is configured to receive Bluetooth signals broadcasted by one or more Bluetooth modules 110 (for example, Bluetooth modules 1101, 1102, and 1103 respectively carried by three persons 901, 902, and 903 as shown in FIG. 2). The living organism statistical device 150 further includes a signal intensity determining module 153. The signal intensity determining module 153 determines the signal intensity of each received Bluetooth signal and determine, based on the signal intensity, whether the corresponding Bluetooth module 110 is located in the predetermined spatial region 900. In other words, in an embodiment, the living organism statistical device 150 determines that the Bluetooth module 110 is located in the predetermined spatial region 900, i.e., determines that the Bluetooth module 110 is sensed only when the signal intensity of the Bluetooth signal received by the living organism statistical device 150 is greater than or equal to a predetermined value. As such, it can avoid counting Bluetooth modules 110 in other predetermined spatial regions into the current predetermined spatial region 900, thus being conducive to improving the accuracy of the quantity information of the persons 90.

For example, as shown in FIG. 2, if a person 901 carrying a Bluetooth module 1101 enters the predetermined spatial region 900 as shown in FIG. 2 from an entrance, when the person 901 substantially enters the predetermined spatial region 900, the Bluetooth communication module 151 of the living organism statistical device 150 can receive, by scanning, a Bluetooth signal broadcasted by the Bluetooth module 1101, and the signal intensity determining module 153 can determine that the signal intensity of the received Bluetooth signal is greater than or equal to a predetermined value. Therefore, it can be basically determined that the person 901 has entered the predetermined spatial region 900, and then the living organism statistical device 150 can automatically add 1 to the quantity of the persons in the predetermined spatial region 900. In contrast, if the person 903 carrying the Bluetooth module 1101 leaves the predetermined spatial region 900 as shown in FIG. 2 from another entrance, the living organism statistical device 150 performs the above process in a reversed order. Finally, the living organism statistical device 150 can automatically subtract 1 from the quantity of the persons in the predetermined spatial region 900.

It should be noted that the Bluetooth signal broadcasted by the Bluetooth module 1101 as shown in FIG. 2 can be received by scanning by a living organism statistical device 150 in another predetermined spatial region 900. However, as the intensity of the received Bluetooth signal is less than the predetermined value, it can be judged that the Bluetooth module 1101 is not located in the another predetermined spatial region 900 currently, and the living organism statistical device 150 in the another predetermined spatial region 900 will not count this reception of the Bluetooth signal.

It should be understood that before receiving the Bluetooth signal broadcasted by the Bluetooth module 110 in the predetermined spatial region, the living organism statistical device 150 in the predetermined spatial region 900 can establish a Bluetooth connection with the corresponding Bluetooth module 110. In an embodiment, the living organism statistical device 150 dynamically scans all current Bluetooth modules 110 in the predetermined spatial region 900 constantly, and receives Bluetooth signals broadcasted by the Bluetooth modules 110 sequentially, so as to roughly obtain, in real time, changes in the quantity information of persons in the predetermined spatial region 900.

Still referring to FIG. 5, the living organism statistical device 150 further includes a calculating module 155 configured to calculate quantity information of the persons 90 in the predetermined spatial region 900 based on the received Bluetooth signals. For example, if Bluetooth signals respectively sent by N Bluetooth modules 110 are received sequentially during scanning, the quantity of the persons 90 is counted to N. It should be noted that when the quantity information of the persons 90 in the predetermined spatial region 900 is calculated based on the received Bluetooth signals, the quantity information of the persons 90 in the predetermined spatial region 900 can be calculated based on reception of different Bluetooth signals. In this case, the received Bluetooth signals are not analyzed specifically, and can be directly counted according to receiving results.

According to a specific requirement, the calculating module 155 can further perform further calculation based on the quantity information, for example, further calculate density information of the persons 90 in the predetermined spatial region 900 based on the quantity information, and even calculate to obtain substantial density distribution information further based on signal intensity values of the received Bluetooth signals.

In an embodiment, the Bluetooth signal broadcasted by each Bluetooth module 110 can include UUID information corresponding to the Bluetooth module 110. Therefore, the UUID information can be received by a living organism statistical device 150. The calculating module 155 can thus further determine a specific Bluetooth module 110 or person 90 located in the predetermined spatial region 900 based on the received UUID information. It will be understood that the Bluetooth module 110 can further send or broadcast other information through the broadcasted Bluetooth signal according to specific requirements. The living organism statistical device 150 can also correspondingly be configured to analyze the Bluetooth signal and obtain the other information.

Still referring to FIG. 5, the living organism statistical device 150 further includes an information sending module 157. By means of the information sending module 157, on one hand, the living organism statistical device 150 can establish a communication connection 159 with an HVAC control management unit 190 of an HVAC system, and on the other hand, the living organism statistical device 150 can send or upload the above information obtained by calculation by the calculating module 155 to the HVAC control management unit 190.

Figure 4:
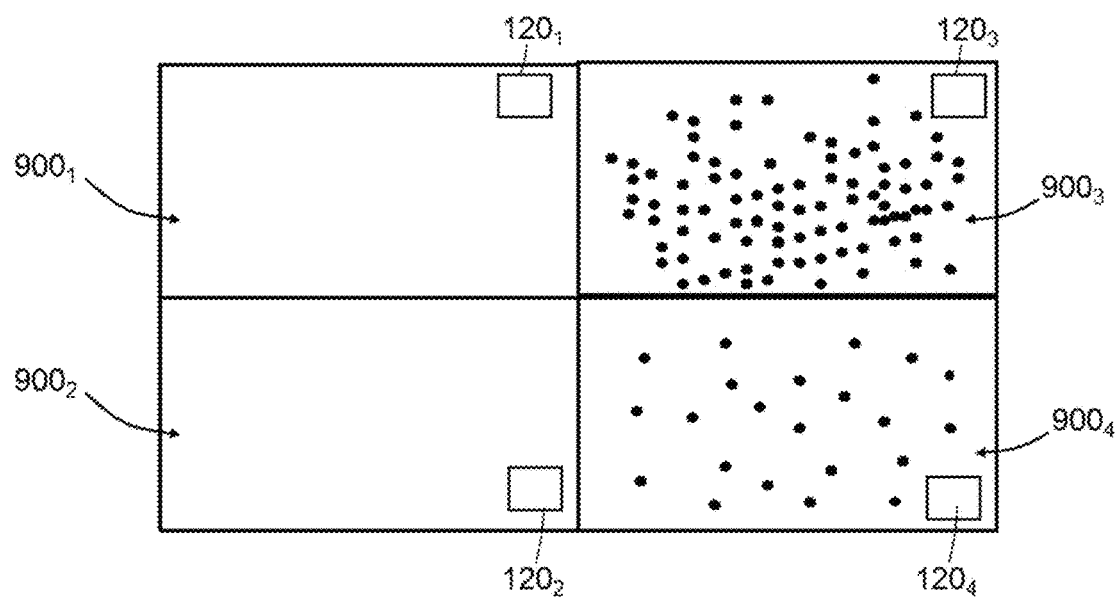
FIG. 4 is a schematic diagram of quantity information of persons acquired by a living organism statistical system according to an embodiment of the present invention.

FIG. 4 is a schematic diagram of quantity information of persons acquired by a living organism statistical system according to an embodiment of the present invention. By taking four predetermined spatial regions 9001, 9002, 9003, and 9004 as an example, air terminal devices 1201, 1202, 1203, and 1204 (e.g., FCUs respectively mounted in each predetermined spatial region) of an HVAC system are mounted correspondingly in the predetermined spatial regions. A living organism statistical device 150 for each predetermined spatial region can respectively obtain quantity information of persons as shown in FIG. 4. The quantities of the persons in the predetermined spatial regions 9001 and 9002 are basically 0. The quantity of the persons in the predetermined spatial region 9003 is the largest relatively, and the density of the persons is the highest. The quantity of the persons in the predetermined spatial region 9004 is average, and the density of the persons is average. Therefore, the air terminal device 1203 correspondingly disposed in the predetermined spatial region 9003 may need to increase the blast volume and reduce the temperature to meet environmental requirements of high-density persons. The air terminal devices 1201 and 1202 correspondingly disposed in the predetermined spatial regions 9001 and 9002 may need to be turned off or reduce the blast volume.

It will be understood that person distribution information of the four predetermined spatial regions 9001, 9002, 9003, and 9004 as shown above in FIG. 4 may also be person distribution information corresponding to four sub-regions of one predetermined spatial region, and different air terminal devices 1201, 1202, 1203, and 1204 of the different sub-regions can also be controlled respectively.

Still referring to FIG. 1 and FIG. 5, the living organism statistical device 150 in the control system 10 can establish, for example, a wired or wireless communication connection 159 with the HVAC control management unit 190 of the HVAC system. Therefore, the information similar to that shown in FIG. 4 and acquired by the living organism statistical device 150 can be sent to one or more HVAC control management units 190 correspondingly connected to the plurality of air terminal devices 120 disposed in the predetermined spatial region 900. Correspondingly, the HVAC control management unit 190 is provided with a receiving unit 191 configured to receive the quantity information and/or even density information.

Correspondingly, in this embodiment, as shown in FIG. 5, the HVAC control management unit 190 is further provided with a control signal generating unit 192. The control signal generating unit 192 acquires at least the received quantity information of persons and perform data analysis processing on the quantity information, so as to generate a terminal device control signal 128 at least based on the quantity information of persons. The specific algorithm of the data analysis processing is not limited, and a followed algorithm principle can vary according to different application sites, different user requirements, different climate regulations of different regions, and the like. For example, when the density information of persons in the predetermined spatial region 900 reflects that the quantity of persons in the predetermined spatial region is continuously 0 in a period of time, a terminal device control signal 128 for tuning off the air terminal device 120 can be generated. Alternatively, when the density information of persons in the predetermined spatial region 900 reflects that the quantity of persons in the predetermined spatial region is continuously greater than 0 in a period of time, a terminal device control signal 128 for turning on the air terminal device 120 can be generated, and the terminal device control signal 128 includes instructions of enabling blast volume, temperature, humidity and the like of the air terminal device 120 to be set to initial set values. Alternatively, when the density information or quantity information of persons in the predetermined spatial region 900 reflects that the quantity of persons in the predetermined spatial region is greater than or equal to a predetermined value continuously in a period of time, it indicates that the predetermined spatial region is increasingly crowded, a terminal device control signal 128 for adjusting and changing the air terminal device 120 from initial values can be generated, and the terminal device control signal 128 enables initial set values of the blast volume, temperature, humidity and the like of the air terminal device 120 to be changed to a certain value respectively.

By taking blast volume control over the terminal device control signal 128 as an example, as the density of persons 90 in the predetermined spatial region 9003 as shown in, for example, FIG. 4 increases constantly, the control signal generating unit 192 can generate different terminal device control signals 128 for increasing the blast volume stage by stages or continuously, and the blast volume of the corresponding air terminal device 1203 is increased by stages or continuously; otherwise, the blast volume is reduced.

Therefore, the control system 10 according to the embodiment of the present invention can control the air terminal device 120 based on dynamic changes of persons 90 in the predetermined spatial region 900, so as to control the air terminal device 120 self-adaptively according to the changes in the predetermined spatial region 900. Therefore, a relatively comfortable environmental condition is obtained, and the energy utilization of the HVAC system is high. The HVAC control management unit 190 of the control system 10 can replace the function of a conventional thermostat disposed on the wall, and the mounting of the thermostat can be omitted as required, thus being conducive to avoiding the wiring installation on the wall and reducing costs. Moreover, the control system 10 can automatically control the air terminal device 120 in the predetermined spatial region 900 self-adaptively, and the user does not need to perform adjustment and control manually, which is more scientific and reasonable compared with manual adjustment control and has good user experience.

It should be noted that after receiving the corresponding terminal device control signal 128, the air terminal device 120 can perform conversion or the like to obtain a corresponding control instruction. Therefore, the air terminal device 120 is driven to operate based on the control instruction.

It should be further noted that in order to avoid over-frequently controlling the air terminal device 120 dynamically due to frequent dynamic changes of persons 90 in the predetermined spatial region 900, a lagged response time of the control signal generating unit 192 can be set. For example, only when the received quantity information of persons is always in a numerical range in a certain period of time (e.g., 5 minutes), can a terminal device control signal 128 corresponding to the range be generated.

In another embodiment, as shown in FIG. 3, the control system 10 can adjust and control corresponding air terminal devices 120 based on active inputs of a plurality of persons in the predetermined spatial region 900.

As shown in FIG. 3, the Bluetooth module 110 can be provided with an input button and a display indicator component. The input component includes a button 111, and the display component includes an indicator 112 and an indicator 113. The button 111 is configured for inputting feeling feedback information of "too cold" and "too hot". The indicator 112 is configured to display that the feeling feedback information of "too cold" is currently input, and the indicator 113 is configured to display that the feeling feedback information of "too hot" is currently input. Therefore, by means of the input component on the Bluetooth module 110, the person 90 carrying the Bluetooth module 110 can conveniently input feeling feedback information indicating his/her feeling for the current environment of the predetermined spatial region 900 where the person is located. In an alternative embodiment, the input component on the Bluetooth module 110 can be configured for inputting an instruction for adjusting current environmental conditions of the predetermined spatial region 900 where the Bluetooth module 110 is located. For example, when the button 111 is pressed once, it is used for inputting a "to raise temperature" instruction, and in the meantime, the indicator 112 is turned on. When the button 111 is pressed a second time, it is used for inputting a "to reduce temperature" instruction, and in the meantime, the indicator 113 is turned on and the indicator 112 is turned off. When the button 111 is pressed a third time, the indicator 113 is turned off, and information inputting is stopped.

The feeling feedback information or instructions inputted on the Bluetooth module 110 can be broadcasted based on the Bluetooth signal. Correspondingly, the living organism statistical device 150 is configured to analyze the received Bluetooth signal to acquire the feeling feedback information, and categorize, count and calculate various types of the acquired feeling feedback information proportionally, so as to obtain a proportion value of each type of the feeling feedback information among all types of the feeling feedback information, or configured to acquire the instructions from the received Bluetooth signals, and categorize, count and calculate various types of the instructions to obtain a proportion value of each type of the instructions among all types of the instructions, which is specifically implemented by, for example, the calculating module 155 of the living organism statistical device 150 as shown in FIG. 5. For example, after the living organism statistical device 150 receives feeling feedback information/instructions of N persons 90 in the corresponding predetermined spatial region 900 in a certain period of time, the calculating module 155 performs statistical calculation on the feeling feedback information/instructions of the N persons 90 to obtain a proportion value of each type of the feeling feedback information/instructions indicating that an aspect (e.g., the temperature) of the current environmental condition needs to be changed. For example, a proportion value of persons who require to raise the temperature and a proportion value of persons who require to reduce the temperature in the N persons 90 are statistically calculated respectively. The feeling feedback information/instructions input by the N persons 90 and proportion values thereof can also be sent to the HVAC control management unit 190. Based on the feeling feedback information/instructions of the N persons 90 and the proportion values thereof, a control signal generating module 192 of the HVAC control management unit 190 is enabled only when the proportion value is greater than or equal to a predetermined value to adjust and change the current terminal device control signal 128 according to the feeling feedback information/instructions corresponding to the larger proportion value, such that the control over the terminal device control signal 128 can reflect control requirements of most of the N persons 90.

For example, if the temperature in the predetermined spatial region 900 is too low, most of the N persons 90 will input feeling feedback information of "too cold", and few or none will input feeling feedback information of "too hot". As such, the calculating module 155 of the living organism statistical device 150 can calculate a proportion value of the feeling feedback information of "too cold" in the feeling feedback information input by the N persons 90. When the HVAC control management unit 190 determines that the proportion value of the feeling feedback information of "too cold" is greater than or equal to a predetermined proportion value (e.g., 80%), the HVAC control management unit 190 performs automatic temperature raising control over the terminal device control signal 128.

Therefore, it is equivalent to that each person 90 can implement "vote-type" control over the environmental conditions of the predetermined spatial region 900 by using the buttons 111 and 112 on the Bluetooth module 110.

The predetermined proportion value can be selectively set in the range from 70% to 90%, thus avoiding over-frequent and useless adjustment and change in the terminal device control signal. Specifically, the predetermined proportion value can be set to 80%, which reflects that operation of the air terminal device 120 is changed by adjusting and changing the terminal device control signal 128 only when 80% of the persons in the predetermined spatial region 900 require changing the current environment conditions.

A predetermined quantity value can be set by the living organism statistical device 150. The proportion value is calculated only when the quantity of persons who input the feeling feedback information/instructions is greater than or equal to the predetermined quantity value, and then the HVAC control management unit 190 performs control based on the proportion value.

Figure 6:
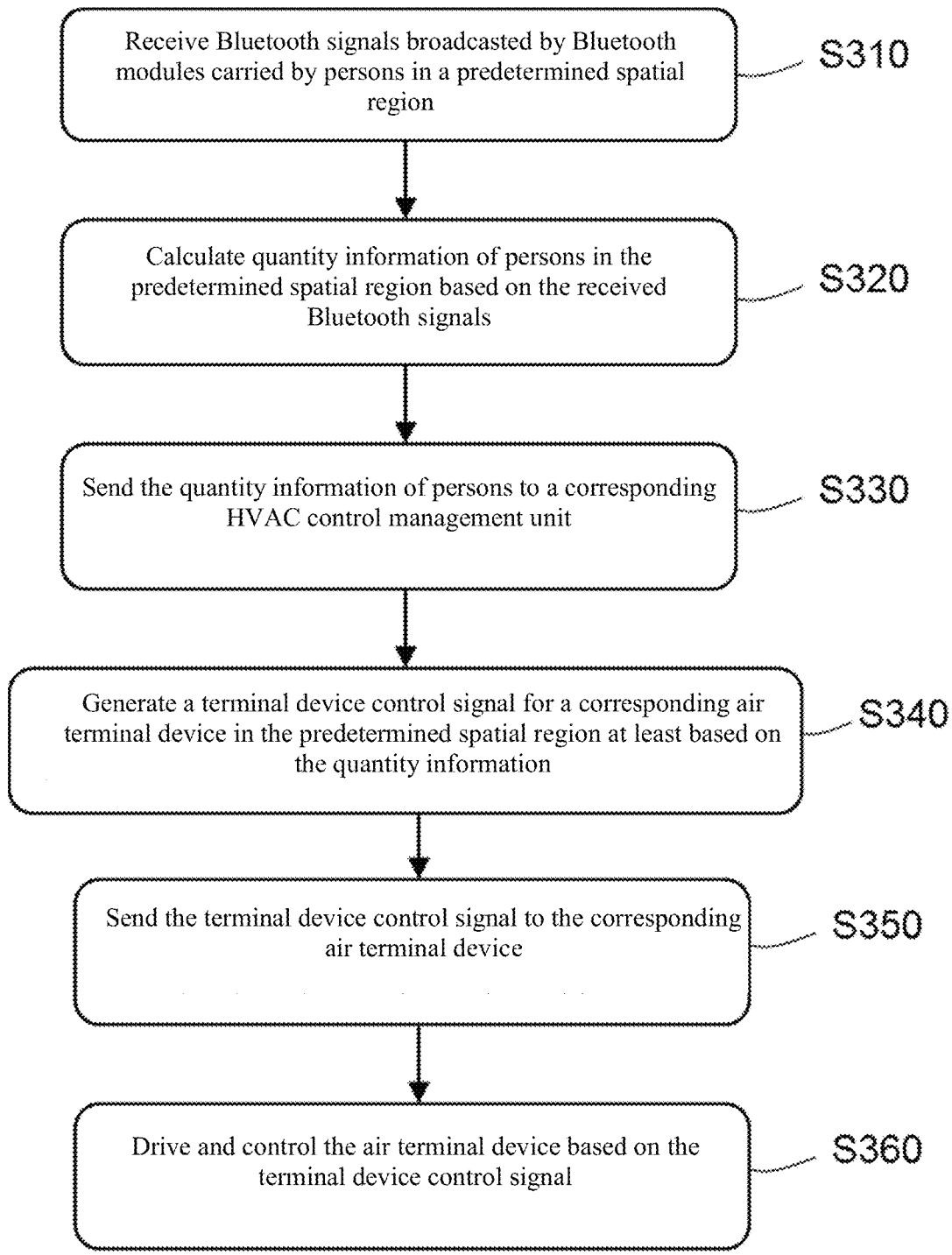
FIG. 6 is a schematic flowchart of a control method of an embodiment used in the control system in the embodiment of FIG. 1.

A schematic flowchart of a control method according to an embodiment of the present invention is illustrated in the following with reference to FIG. 5 and FIG. 6.

First, in step S310, Bluetooth signals broadcasted by Bluetooth modules 110 carried by persons 90 in a predetermined spatial region 900 are received. Definitely, during this step, each Bluetooth module 110 entering the predetermined spatial region 900 broadcasts a corresponding Bluetooth signal at the same time. The broadcasted Bluetooth signals can include, but are not limited to, UUIDs, feeling feedback information/instructions, and the like mentioned in the foregoing.

In an embodiment, in this step, the signal intensity of each received Bluetooth signal can be determined by the signal intensity determining module 153 as shown in FIG. 5.

In step S320, quantity information of persons in the predetermined spatial region 900 is calculated based on the received Bluetooth signals. This step can be implemented by the calculating module 155 of the living organism statistical device 110. Reference can be made to the exemplary illustrations on the living organism statistical device 110 and the calculating module 155 thereof for specific method principles of obtaining density information of persons.

During calculation of this step, in an embodiment, it is first determined, based on the obtained signal intensity of the Bluetooth signal, whether a corresponding Bluetooth module 110 is located in the predetermined spatial region 900. If the corresponding Bluetooth module 110 is located in the predetermined spatial region 900, 1 is added to the quantity of persons in the predetermined spatial region 900.

In an embodiment, in step S320, it is possible to further calculate to obtain density of persons in the predetermined spatial region 900 based on the quantity information, and even calculate to obtain substantial density distribution information.

In an embodiment, in step S320, it is further possible to automatically count persons 90 entering the predetermined spatial region 900 according to the UUIDs in the received Bluetooth signals. If the feeling feedback information/instructions are further received, the feeling feedback information/instructions can be further calculated statistically to obtain a proportion value of each type of the feeling feedback information/instructions in a certain aspect (e.g., temperature) of the current environmental conditions that need to be changed.

Further, in step S330, the quantity information of persons is sent to a corresponding HVAC control management unit 190. Definitely, other information such as the density information of persons can also be sent to the HVAC control management unit 190. Specifically, the average quantity information and/or above other information can be sent in different time periods (e.g., every 5 or 10 minutes).

Further, in step S340, a terminal device control signal 128 for a corresponding air terminal device 120 in the predetermined spatial region 900 is generated at least based on the quantity information. The specific process of generating the terminal device control signal 128 can be obtained with reference to the above illustrations on the HVAC control management unit 190 and the control signal generating unit 192 thereof.

Further, in step S350, the terminal device control signal 128 is sent to the corresponding air terminal device 120. When one predetermined spatial region 900 corresponds to a plurality of air terminal devices 120 and generated terminal device control signals 128 are the same, the HVAC control management unit 190 sends the same terminal device control signal 128 to the plurality of air terminal devices 120. When one predetermined spatial region 900 corresponds to a plurality of air terminal devices 120 and corresponding terminal device control signals 128 are different, the HVAC control management unit 190 can send the plurality of different terminal device control signals 128 respectively to the air terminal devices 120 in different positions in the predetermined spatial region 900 according to recorded position information of the plurality of air terminal devices 120.

Further, in step S360, the air terminal device 120 is driven and controlled based on the corresponding terminal device control signal 128.

So far, the method process of self-adaptively controlling the air terminal device 120 in the predetermined spatial region 900 ends basically. As the quantity of persons 90 in the predetermined spatial region 900 changes, the quantity of Bluetooth modules 110 in the predetermined spatial region 900 changes correspondingly, and the Bluetooth module 110 sensed by the living organism statistical device 150 also changes. Different terminal device control signals 128 can be obtained by repeating the above control method process, thus implementing dynamic control.

It will be understood that the "predetermined spatial region" can be a spatial region that is physically defined by physical components such as walls, and can be, for example, but is not limited to, an office in a building, a meeting room, a dining hall, a cinema, a shopping store, or the like; and can be, but is not limited to, an elevator car, a vehicle carriage (e.g., a subway carriage), or the like. The "predetermined spatial region" can further be a relatively open spatial region that is defined intangibly, for example, defined by a range of Bluetooth modules 110 that can be sensed by the living organism statistical device 150. It should be understood that the predetermined spatial region can be defined by a user of the control system subjectively, and different specific predetermined spatial regions can be defined according to specific application scenarios. The predetermined spatial region may not have a clear boundary area as shown in FIG. 1 and FIG. 2.

In the above embodiments, specific illustrations are made by taking controlling the air terminal devices such as FCUs of the HVAC system that are mounted in the predetermined spatial region as an example. Those skilled in the art can implement dynamic intelligent control over other indoor devices (such as a lighting component and a projector) in the predetermined spatial region analogically by using the control system under the teaching of the above examples.

It should be noted that the elements (including flowcharts and block diagrams in the accompanying drawings) disclosed and depicted in this text are intended to mean logical boundaries between elements. However, according to software or hardware engineering practices, the depicted elements and functions thereof can be executed on a machine by a computer executable medium. The computer executable medium has a processor that can execute a program instruction stored in the computer executable medium. The program instruction is used as a single-chip software structure, as an independent software module, or as a module using external programs, codes, services, and the like, or as any combination of the foregoing. All these execution solution can fall within the scope of the disclosure.

Different unlimited implementation solutions have specifically illustrated components; however, the implementation solutions of the present invention are not limited to these specific combinations. Some of components or features from any unlimited implementation solution can be used to be combined with features or components from any other unlimited implementation solution.

Although specific step orders are shown, disclosed and required, it should be understood that the steps can be implemented, separated, or combined in any order, and will still benefit from the disclosure unless otherwise specified.

The above examples mainly illustrate the living organism statistical device, the living organism statistical system, the method of controlling devices in a predetermined spatial region and the control method thereof according to the present invention. Some implementation manners of the present invention are described; however, those of ordinary skill in the art should understand that the present invention may be implemented in many other forms without departing from the substance and scope thereof. For example, the control signal generating unit 192 in the embodiment of FIG. 5 is disposed in the living organism statistical device 150, or a part of functions of the living organism statistical device 150 is implemented in the HVAC control management unit 190. Therefore, the displayed examples and implementation manners are considered as schematic instead of limited, and the present invention may incorporate various modifications and replacements without departing from the spirit and scope of the present invention as defined in the appended claims.

What is claimed is:

1. A living organism statistical device, which can be mounted in a predetermined spatial region, wherein the living organism statistical device is configured to receive Bluetooth signals of Bluetooth modules carried by living organisms and obtain quantity information of living organisms in the predetermined spatial region based on the received Bluetooth signals, the living organism statistical device comprising:
a Bluetooth communication module configured to receive Bluetooth signals from one or more of the Bluetooth modules by scanning; and
a signal intensity determining module configured to determine signal intensity of each received Bluetooth signal and determine, based on the signal intensity, whether a corresponding Bluetooth module is located in the predetermined spatial region;
a calculating module configured to acquire, from the received Bluetooth signals, various types of feeling feedback information input from the Bluetooth modules and categorize, count and calculate the acquired feeling feedback information proportionally to acquire a proportion value of each type of the feeling feedback information and configured to acquire, from the received Bluetooth signals, various types of instructions input from the Bluetooth modules and categorize, count and calculate the acquired instructions proportionally to acquire a proportion value of each type of the instructions.

2. The living organism statistical device according to claim 1, wherein the living organism statistical device is further configured to calculate density information of the living organisms in the predetermined spatial region based on the quantity information.

3. The living organism statistical device according to claim 1, wherein the living organism statistical device is correspondingly provided with a solar panel.

4. The living organism statistical device according to claim 1, wherein the living organism statistical device is in communication connection with a corresponding Heating Ventilation Air Conditioning (HVAC) control management unit of an HVAC system configured to control at least environment conditions of the predetermined spatial region, and send at least the quantity information to the HVAC control management unit in real time or according to a predetermined time interval.

5. The living organism statistical device according to claim 1, wherein the living organism statistical device is mounted at the top of the predetermined spatial region.

6. The living organism statistical device according to claim 1, wherein the Bluetooth module is a Bluetooth low energy module and/or the living organism statistical device is constructed into a Bluetooth low energy hub.

7. A living organism statistical system for a predetermined spatial region, comprising:
a Bluetooth module that can be carried by a living organism and configured to broadcast a Bluetooth signal; and
a living organism statistical device, which can be mounted in the predetermined spatial region, wherein the living organism statistical device is configured to receive Bluetooth signals of Bluetooth modules carried by living organisms and obtain quantity information of living organisms in the predetermined spatial region based on the received Bluetooth signals, the living organism statistical device comprising:
a Bluetooth communication module configured to receive Bluetooth signals from one or more of the Bluetooth modules by scanning;
a signal intensity determining module configured to determine signal intensity of each received Bluetooth signal and determine, based on the signal intensity, whether a corresponding Bluetooth module is located in the predetermined spatial region;
a calculating module configured to acquire, from the received Bluetooth signals, various types of feeling feedback information input from the Bluetooth modules and categorize, count and calculate the acquired feeling feedback information proportionally to acquire a proportion value of each type of the feeling feedback information and configured to acquire, from the received Bluetooth signals, various types of instructions input from the Bluetooth modules and categorize, count and calculate the acquired instructions proportionally to acquire a proportion value of each type of the instructions.

8. The living organism statistical system according to claim 7, wherein the Bluetooth module is constructed into a card shape or is implemented by a smart phone, a wearable smart device, or a personal digital assistant.

9. The living organism statistical system according to claim 7, wherein each Bluetooth module is provided with an input component configured for inputting feeling feedback information of feeling about a current environment of the predetermined spatial region or configured for inputting an instruction for adjusting a current environment of the predetermined spatial region; and the feeling feedback information or the instruction is broadcasted through the Bluetooth signal.

10. The living organism statistical system according to claim 9, wherein the input component includes:
a button configured for inputting the feeling feedback information or the instruction;
a first indicator configured to display that feeling feedback information of "too cold" or a "to raise temperature" instruction has been input; and
a second indicator configured to display that feeling feedback information of "too hot" or a "to reduce temperature" instruction has been input.

11. The living organism statistical system according to claim 7, wherein the Bluetooth signal comprises Unique Universal Identifier information corresponding to the Bluetooth module.

12. The living organism statistical system according to claim 7, wherein the Bluetooth module and/or the living organism statistical device is correspondingly provided with a solar panel.

13. A system for controlling a device in a predetermined spatial region, the device in the predetermined spatial region comprising one or more air terminal devices of a Heating Ventilation Air Conditioning (HVAC) system mounted in the predetermined spatial region, the system comprising:

a living organism statistical system including:
a Bluetooth module that can be carried by a living organism and configured to broadcast a Bluetooth signal; and
a living organism statistical device, which can be mounted in the predetermined spatial region, wherein the living organism statistical device is configured to receive Bluetooth signals of Bluetooth modules carried by living organisms and obtain quantity information of living organisms in the predetermined spatial region based on the received Bluetooth signals, the living organism statistical device comprising:
a Bluetooth communication module configured to receive Bluetooth signals from one or more of the Bluetooth modules by scanning;
a signal intensity determining module configured to determine signal intensity of each received Bluetooth signal and determine, based on the signal intensity, whether a corresponding Bluetooth module is located in the predetermined spatial region;
a calculating module configured to acquire, from the received Bluetooth signals, various types of feeling feedback information input from the Bluetooth modules and categorize, count and calculate the acquired feeling feedback information proportionally to acquire a proportion value of each type of the feeling feedback information and configured to acquire, from the received Bluetooth signals, various types of instructions input from the Bluetooth modules and categorize, count and calculate the acquired instructions proportionally to acquire a proportion value of each type of the instructions; and
an HVAC control management unit of the HVAC system, wherein the living organism statistical system is in communication connection with the HVAC control management unit, and the HVAC control management unit is configured to automatically control the one or more air terminal devices at least based on the quantity information obtained by the living organism statistical system.

14. The system according to claim 13, wherein the HVAC control management unit is provided with:
a receiving unit configured to at least receive the quantity information of the living organisms; and
a control signal generating unit configured to generate a corresponding terminal device control signal at least based on the quantity information.

15. The system according to claim 14, wherein the HVAC control management unit is configured to send the terminal device control signal to the corresponding air terminal device in the predetermined spatial region.

16. The system according to claim 13, wherein the control signal generating unit is further configured to:
when the feeling feedback information or a proportion value of each type of the feeling feedback information can be obtained, generate a corresponding terminal device control signal based on the feeling feedback information or the proportion value; or
when the instructions for adjusting a current environment of the predetermined spatial region or a proportion value of each type of the instructions can be obtained, generate a corresponding terminal device control signal based on the instructions or the corresponding proportion value of the instructions.

17. The system according to claim 16, wherein the control signal generating unit is further configured to, when a proportion value of one type of the feeling feedback information or the instructions is greater than or equal to a predetermined proportion value, generate a terminal device control signal corresponding to the type of the feeling feedback information or the instructions.

18. A method for controlling a device in at least one predetermined spatial region, the device in the predetermined spatial region comprising one or more air terminal devices of a Heating Ventilation Air Conditioning (HVAC) system mounted in the predetermined spatial region, wherein the method comprises:
receiving Bluetooth signals of Bluetooth modules carried by living organisms in the predetermined spatial region;
obtaining quantity information of the living organisms in the predetermined spatial region based on the received Bluetooth signals; and
inputting feeling feedback information of feeling about a current environment of the predetermined spatial region or inputting instructions for adjusting current environment conditions of the predetermined spatial region, the feeling feedback information or the instructions being broadcasted through the Bluetooth signal;
acquiring, from the received Bluetooth signals, the feeling feedback information or the instructions and categorizing, counting and calculating the acquired feeling feedback information or the instructions proportionally to acquire a proportion value of each type of the feeling feedback information or each type of the instructions; and
generating a corresponding terminal device control signal based on the proportion value of the feeling feedback information or the instructions;
automatically controlling one or more of the air terminal devices at least based on the quantity information, wherein the HVAC control management unit is connected to one or more of the air terminal devices.

19. The method according to claim 18, wherein the controlling one or more of the air terminal devices comprises:
generating a terminal device control signal corresponding to the air terminal device in the predetermined spatial region at least based on the quantity information;
sending the terminal device control signal to the corresponding air terminal device; and
driving and controlling the corresponding air terminal device based on the terminal device control signal.

20. The method according to claim 18, wherein the quantity information of the living organisms further comprises density information of the living organisms.

21. The method according to claim 18, wherein the Bluetooth signal comprises Unique Universal Identifier information of the Bluetooth module that broadcasts the Bluetooth signal.

22. The method according to claim 18, wherein in generating a corresponding terminal device control signal based on the proportion value of the feeling feedback information or the instructions, when a proportion value of one type of the feeling feedback information or the instructions is greater than or equal to a predetermined proportion value, a terminal device control signal corresponding to the type of the feeling feedback information or the instructions is generated.

* * * * *